March 10, 1959  J. A. JOHNSON  2,876,522
APPARATUS FOR SHAPING CLAY-WARE
Filed Dec. 29, 1954  4 Sheets-Sheet 1

JOHN ARTHUR JOHNSON
Inventor

By
Attorney

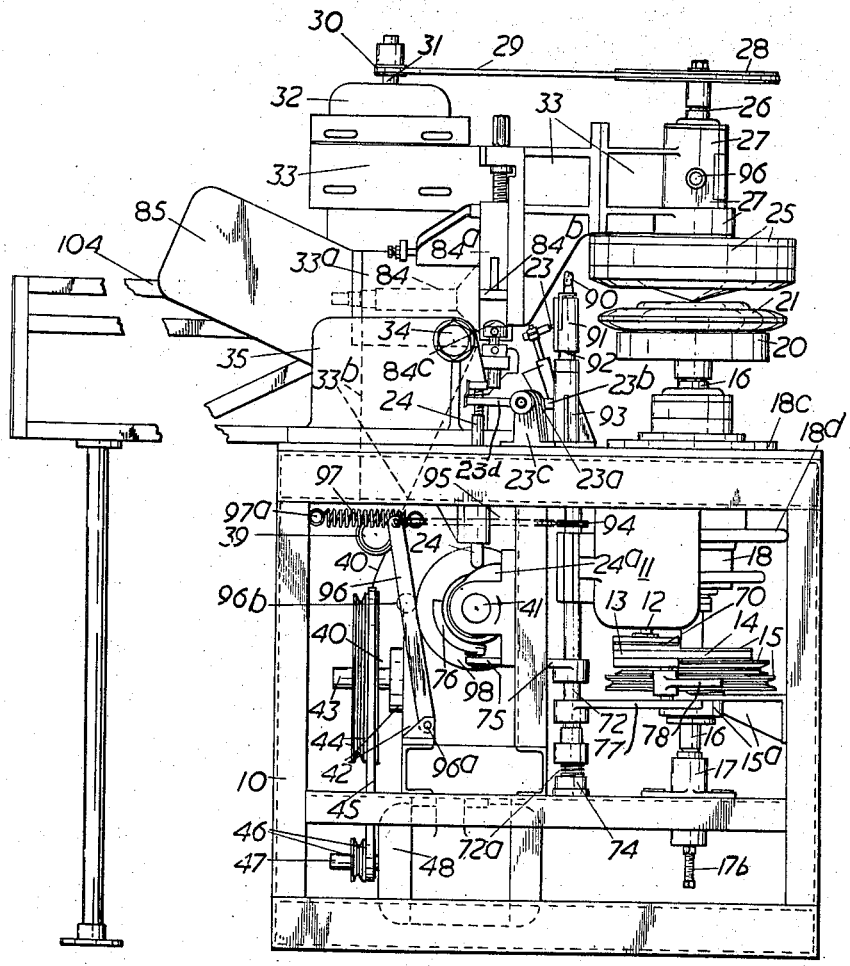

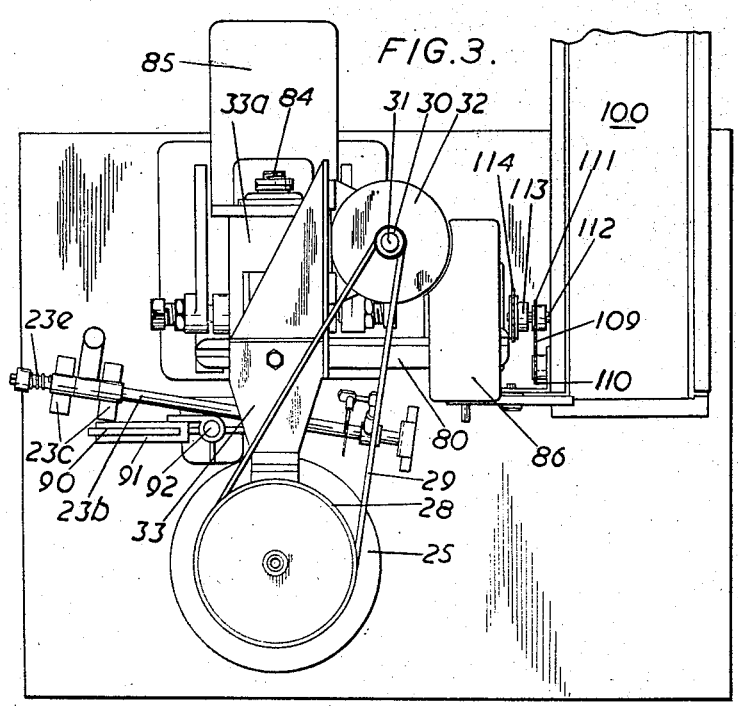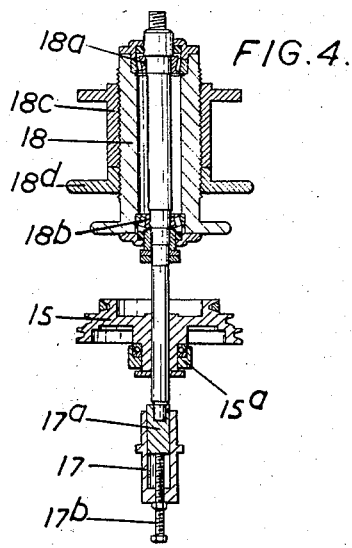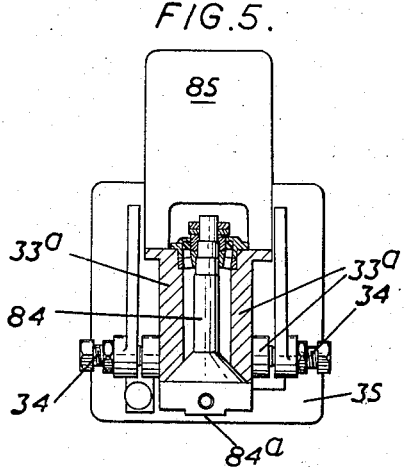

March 10, 1959 J. A. JOHNSON 2,876,522
APPARATUS FOR SHAPING CLAY-WARE
Filed Dec. 29, 1954 4 Sheets-Sheet 4
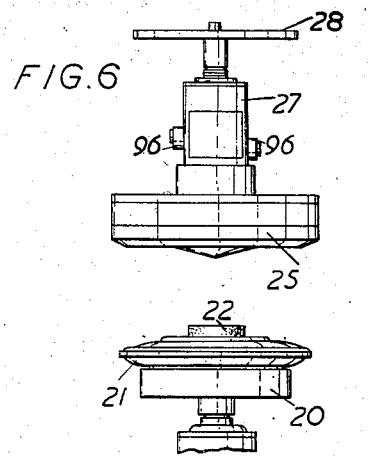
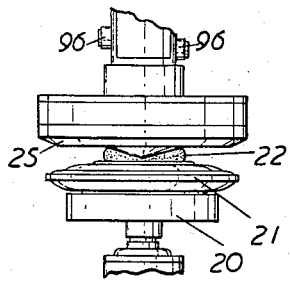
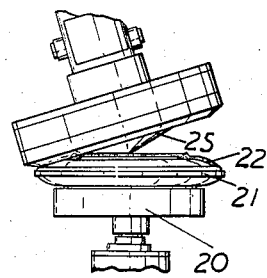
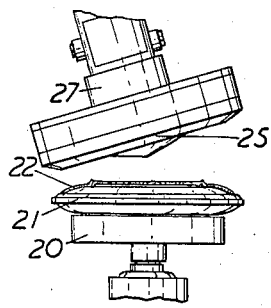
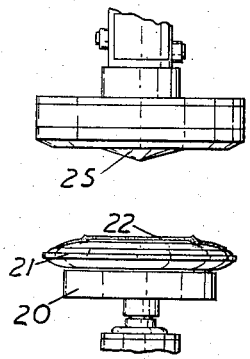
Inventor
JOHN ARTHUR JOHNSON
By
Attorney United States Patent Office 2,876,522
Patented Mar. 10, 1959

2,876,522
APPARATUS FOR SHAPING CLAY-WARE
John A. Johnson, Stoke-on-Trent, England
Application December 29, 1954, Serial No. 478,243
1 Claim. (Cl. 25—24)

This invention relates to the shaping of clay-ware.
The invention is concerned with manufacturing flat clay tableware, e. g., plates and saucers, by the method in which a mass of clay upon a rotating mold is brought directly to final shape suitable for immediate drying and firing by use of a rotary shaping tool having an operative portion generally in the shape of a cone of very obtuse apical angle so as to present an operative end face, tapering to a point at a center lying on the axis of the tool, which exerts a shaping action upon the mass of clay on the mold by a rolling action during which the axis of rotation of the tool lies at no more than a small angle to the axis of rotation of the mold and the center of its operative face lies on the last-mentioned axis at the center of the mass of clay on the mold, the radius of said operative end face approximating to that of the ware to be shaped.

Heretofore it has been proposed, see, for example, U. S. Patent No. 2,724,164 and British Patent No. 621,712, to bring the rotary shaping tool into engagement with the clay by a simple pivoting movement of an arm which carries it, and whereas it has been found satisfactory, in many instances, to bring the mass of clay on the mold directly into final shape suitable for immediate drying and firing when the tool is operated in this way, the applicant has now found that improved ware results when the tool is operated rather differently. Thus, in accordance with the present invention the center of the operative end face of the tool is first brought into engagement with the clay with the axis of the tool approximately in alignment with the axis of rotation of the mold, so as to exert a preliminary shaping action with a central part only of the operative end face of the tool, and then the axis of rotation of the tool is tilted progressively, keeping the center of said end face approximately fixed in position relative to the mold, to bring the tool into engagement with the clay along the full radius of the mold and exert a final shaping action.

The invention will now be described with reference to the accompanying drawings in which:

Figure 2 is a side elevation.

Figure 3 is a plan.

Figure 4 is a vertical section of the jigger spindle assembly.

Figure 5 is a sectional plan of the pivot assembly about which the roller tool is tilted.

Figures 6, 7, 8, 9 and 10 are elevations showing the jigger head and roller tool at successive stages in the operation of the machine.

Figure 1:
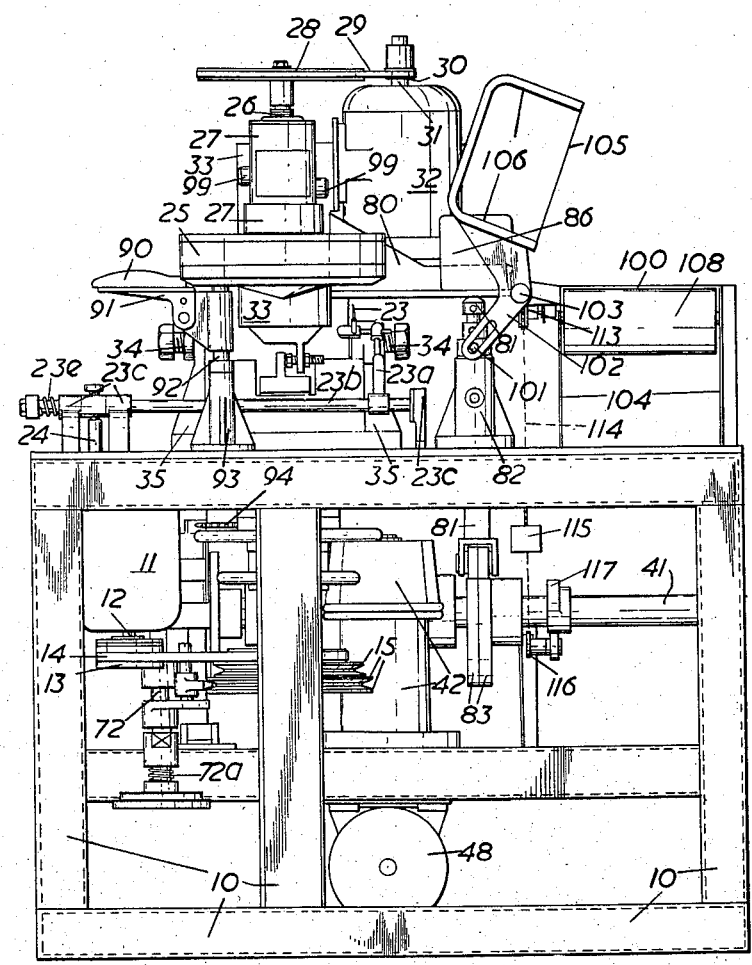
Figure 1 is a front elevation of a machine for making plates or saucers.

The machine comprises a main frame or bench 10 carrying an electric motor 11 which drives a spindle 12 on which a pulley 13 is secured. The pulley 13 by means of a belt 14 drives another pulley 15 having three grooves of different diameters to vary the speed ratio, and the pulley 15 is mounted on the jigger spindle 16 which is carried in bearing housings 17, 18 in the frame 10.

At the top of the spindle 16 is mounted the jigger head 20 in which moulds such as 21 can be carried. On each mould a clay article such as 22, Figures 6 to 10, is shaped by the action of a roller tool 25. The trimming of the rim of the article is effected by a scraper tool 23 which is carried by a bracket 23a fastened to a shaft 23b carried in bearings 23c and having attached to it a lever 23d which is engaged by a push rod 24 actuated by a cam 24a. The shaft 23b is returned to the inoperative position after each actuation by means of a spring 23e. The diameter of the roller tool 25 where it engages with the periphery of the clay article 22 is the same as the diameter of the article and the roller progressively diminishes in diameter with the diameter of the article until in the centre of the article the roller terminates in a point, see especially Figure 8. The roller is mounted on a spindle 26 carried in a housing 27 and driven by means of a pulley 28 by a V-rope 29 from another pulley 30 mounted on the spindle 31 of another electric motor 32 carried by a sub-frame 33, 33a, pivotally mounted at 34 in a bracket structure 35 upstanding from the frame 10. The part 33 extends forwardly and the roller unit 25, 27 is carried by the other end of it. Therefore the roller 25 and its driving motor 32 are pivoted for rocking movement in a vertical plane about the pivot 34. The part 33a of the sub-frame has depending from it an extension piece 33b the other end of which carries a roller 39 which rides on a cam 40 mounted on a shaft 41 driven from a gearbox 42. The gearbox is driven by a pulley 44 and V-rope 45 from another double-grooved pulley 46 mounted on the spindle 47 of a third electric motor 48. The movement of the sub-frame 33, 33a about the pivot 34 brings the roller 25 down so that its axis is approximately vertical when it first comes into contact with the clay 22. The jigger head has a screwed adjustment, see especially Figure 4, for moving it up or down to vary its setting relative to the roller 25. For this purpose the bearing housing 18, which carries a pair of taper roller bearings 18a, 18b, is externally screw-threaded and works in an internally threaded sleeve 18c fastened to the frame 10, so that by screwing the housing up or down in the sleeve the shaft 16 and head 20 are raised or lowered. A locking wheel 18d is provided engaging with the lower end of the housing 18 to lock it at the desired height. The spindle 16 is slidable through its driving pulley 15, the pulley 15 being supported at a fixed height by a bracket 15a on the frame. The bottom bearing housing 17 contains a toe-step 17a and has a set screw 17b which bears on the underside of the toestep 17a to support it at the appropriate height.

It is preferable to make provision for disconnecting the drive to the jigger spindle 16 and bringing it to rest between successive shaping operations. For this purpose the pulley 13 is of split form loose on the spindle 12. When the belt 14 is tightened the two halves of the pulley are opened out and the pulley makes contact with a friction disc 70 fast on the spindle 12, the tightening of the belt 14 being effected by slightly slewing the motor 11 and spindle 12 with the pulley 13. This is effected against the action of a spring 72a by a lever 75 fixed on a shaft 72 carried in bearings 74 and actuated by a scroll cam or profile 76 from the shaft 41. The shaft 72 carries an arm 77 which has a brake shoe 78 attached to it which engages in the grooves of the pulley 15 so that when the drive has been disconnected the brake shoe quickly brings the jigger spindle to rest.

The part 33 has an extension bracket 80 which projects sideways and rests on the upper end of a push rod 81 working in a guide 82 and operated by a separate cam 83 on the shaft 41. The push rod 81 responds to the shape of the cam 83 and imparts a tilting movement to the sub-frame 33, causing the roller tool 25 to heel over sideways, about an axis formed by a spindle 84 mounted within the part 33ª. The end of the spindle 84 is formed at 84ª as a slide on which the sub-frame member 33 moves to enable the central point on the roller 25 to coincide with the axis of the spindle 84 so that the tilting movement of the roller takes place about the point of the roller, this adjustment being necessary to allow various shapes or thicknesses of roller to be used. The part 33ª carries a weight 85 to counterbalance the weight of the roller 25 and associated parts about the pivot 34. The extension bracket 80 carries a weight 86 to counterbalance the weight of the roller 25 and associated parts about the pivot 84. The slide 84ª carries an abutment 84ᵇ which when the roller is fully tilted rests on an adjustable stop 84ᶜ on the bracket structure 35, to obviate any play in the tilted position.

The successive stages in the shaping operation illustrated in Figures 6 to 10. Initially the roller comes down by movement about the pivot 34 from the position shown in Figure 6 to that shown in Figure 7 where the pointed centre of the roller is in contact with the centre of the piece of clay. As the tilting movement develops the surface of the roller comes more and more into contact with the clay until in the position shown in Figure 8 the whole of the roller is in contact along an entire radius of the rotating clay piece 22. Shaping being completed the action of the cam 40 and push rod 81 withdraws the roller progressively as shown in Figures 9 and 10 to permit of the removal of the shaped piece and the recharging of the jigger head 20. Figures 6, 7, 8, 9 and 10 view the roller from the same direction as in Figure 1 that is to say in the plane of the pivotal movement about the pivot 34 and hence the roller axis, prior to the beginning of the tilting movement appears vertical; it will be evident that as viewed in the direction of Figure 2 the roller axis would be inclined. When the roller 25 has reached the Figure 10 position and while the operator is removing the mould 21 with the shaped article 22 and placing a fresh mould in position, the roller 25 has its surface wiped clean by an absorbent wiper 90, which may be impregnated with a cleaning medium. The wiper is mounted on an arm 91 fastened to a spindle 92 carried in a guide 93, and the lower end of the spindle 92 has mounted on it a chain sprocket 94 driven by a chain 95 one end of which is fastened to a rocking lever 96 and the other end of which is attached to a spring 97. The spring is fastened to the frame at 97ª and the rocking lever works on a pivot 96ª also mounted on the frame. The rocking lever carries a roller 96ᵇ which rides on a cam 98 on the shaft 41 so that the movement of the lever pulls or releases the chain under the spring action, and by thus turning the sprocket 94 and shaft 92 swings the wiper 90 into and out of engagement with the roller 25, the roller cam 40 having a slight peak which causes the roller 25 to dip into contact with the wiper at the appropriate phase in its movements. It may be desired to heat the roller, in which case an electric heating element may be mounted within the roller and the housing 27 may be a stationary part carrying contacts or brushes 99 for supplying current to the element.

The machine may be fed with a continuous column of clay on an endless conveyor belt 100 which is operated in a succession of intermittent short movements. The push rod 81 carries an abutment 101 which acts on one end of a lever 102 mounted on a pivot 103 on the frame 104 of the conveyor. The other end of the lever carries a cutter which may be in the form of a wire 105 strained across a frame or holder 106. Each time the conveyor stops the wire cutter 105 is actuated to cut off from the column of clay a piece such as that shown at 22 in Figure 6 suitable for forming one of the articles. The conveyor may be driven by a roller 108 at one end of its run, the roller being operated by a chain 109 and sprockets 110, 111 from a countershaft 112, the countershaft carrying a free wheel device 113 by which it can be rotated in one direction by a chain 114, one end of which carries a weight while the other is attached to a lever 116, the lever 116 being operated by a cam 117 on the shaft 41 to impart a rotary movement to the countershaft and so drive the conveyor, while the return movement of the lever 116 and chain 114 is made under the action of the weight 115 as soon as the lever 116 is released from the cam 117, but because of the free wheel device 113 this does not impart a return movement to the conveyor.

The various auxiliary features and movements mentioned in the prior patents may be incorporated in a machine according to the present invention, for instance provision may be made for ensuring uniform speeds of rotation between the roller and the jigger head and for creating or maintaining speed differences during part or the whole of the shaping operation, and provision may also be made for spraying the surface of the roller with oil or other medium.

It will be evident that it will be desirable also from time to time to alter the timing and progress of the roller movements as the nature of the shaping action will differ with different shapes or sizes of article or different types of clay. Any desired variations can be effected very easily by changing the appropriate cam from which the particular movement is derived.

It may be preferred in some cases for the roller to approach the clay by movement other than a pivotal movement.

I claim:

In a flat clay-ware shaping machine of the type comprising a rotary mould support and a rotary shaping tool having an operative portion generally in the shape of a cone of very obtuse angle so as to present an operative end face, tapering to a point at a center lying on the axis of the tool, which is arranged to exert a shaping operation upon a mass of clay on the mould by a rolling action during which the axis of rotation of the tool lies at no more than a small angle to the axis of rotation of the mould support and the center of its operative end face lies on the last-mentioned axis at the center of the mass of clay on the mould, the radius of said operative end face approximating to that of the ware to be shaped, a bracket in which the tool is mounted for rotation, an electric motor mounted on said bracket and arranged to rotate the tool, a pivot about which the bracket is arranged to tilt under control of a cam to bring the center of the operative end face of the tool into engagement with the clay with the axis of rotation of the tool approximately in alignment with the axis of rotation of the mould support, so as to exert a preliminary shaping action with a central part only of the operative end face of the tool, and a second pivot about which the bracket is arranged to tilt under control of a second cam to tilt the axis of rotation of the tool progressively, keeping the center of said end face approximately fixed in position relative to the mould, to bring the tool into engagement with the clay along the full radius of the mould and exert a final shaping action.

References Cited in the file of this patent

UNITED STATES PATENTS

| | | |
|---|---|---|
| 1,423,009 | Muckenhirn | July 18, 1922 |
| 1,551,728 | Burger | Sept. 1, 1925 |
| 2,029,084 | Schmidt | Jan. 28, 1936 |
| 2,724,164 | Smith et al. | Nov. 22, 1955 |

FOREIGN PATENTS

| | | |
|---|---|---|
| 603,558 | Great Britain | June 17, 1948 |